United States Patent
Taga et al.

(10) Patent No.: US 7,423,672 B2
(45) Date of Patent: Sep. 9, 2008

(54) PICTURE DATA RECORDING METHOD, PICTURE DATA STORAGE MEDIUM, PICTURE DATA PLAYBACK APPARATUS, AND PICTURE DATA PLAYBACK METHOD

(75) Inventors: Yumiko Taga, Kawasaki (JP); Teiichi Ichikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 911 days.

(21) Appl. No.: 10/611,160

(22) Filed: Jul. 2, 2003

(65) Prior Publication Data

US 2004/0022518 A1 Feb. 5, 2004

(30) Foreign Application Priority Data

Jul. 30, 2002 (JP) ............... 2002-221831

(51) Int. Cl.
*H04N 5/228* (2006.01)
*H04N 5/46* (2006.01)
*H04N 5/445* (2006.01)

(52) U.S. Cl. ............... 348/222.1; 348/556; 348/563

(58) Field of Classification Search ............... 348/386, 348/445, 448, 556, 563, 564, 589; 386/37, 386/95, 108, 131
See application file for complete search history.

(56) References Cited

U.S. PATENT DOCUMENTS

| 5,111,297 | A | * | 5/1992 | Tsuji et al. | 348/565 |
|---|---|---|---|---|---|
| 5,414,469 | A | * | 5/1995 | Gonzales et al. | 375/240.18 |
| 5,742,732 | A | * | 4/1998 | Kubo et al. | 386/95 |
| 5,907,659 | A | * | 5/1999 | Yamauchi et al. | 386/95 |
| 5,999,698 | A | * | 12/1999 | Nakai et al. | 386/125 |
| 6,456,780 | B2 | * | 9/2002 | Yagi et al. | 386/54 |
| 6,504,871 | B1 | * | 1/2003 | Varanasi et al. | 375/240.2 |
| 6,614,989 | B1 | * | 9/2003 | Bruls et al. | 386/110 |
| 6,901,207 | B1 | * | 5/2005 | Watkins | 386/83 |
| 2003/0165320 | A1 | * | 9/2003 | Ogawa et al. | 386/52 |
| 2004/0028387 | A1 | * | 2/2004 | Winter | 386/95 |
| 2004/0105586 | A1 | * | 6/2004 | Bayazit | 382/232 |
| 2005/0238243 | A1 | * | 10/2005 | Kondo et al. | 382/239 |

FOREIGN PATENT DOCUMENTS

WO WO 97/42758 11/1997

OTHER PUBLICATIONS

Japanese Office Action dated Dec. 14, 2004, for Japanese Patent Application No. 2002-221831.

* cited by examiner

*Primary Examiner*—James M Hannett
(74) *Attorney, Agent, or Firm*—Pillsbury Winthrop Shaw Pittman, LLP

(57) ABSTRACT

In a picture data recording method of an aspect of this invention, main picture data having a first resolution, sub-picture data having the first resolution, and sub-picture data having a second resolution lower than the first resolution are compressed, packets are formed from the compressed data in accordance with predetermined units and multiplexed, and the multiplexed data is recorded on a recording medium.

10 Claims, 3 Drawing Sheets

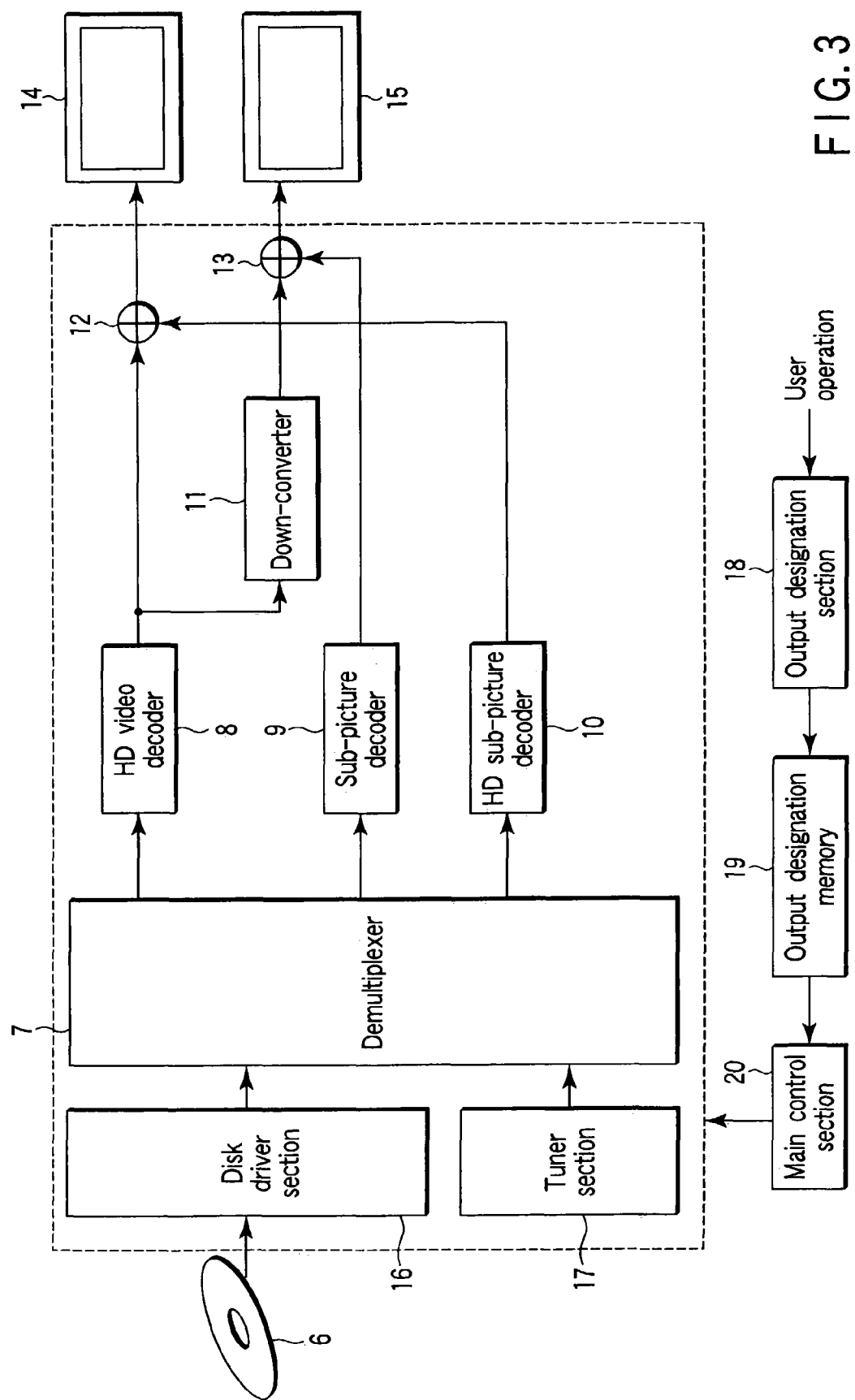
F I G. 3

PICTURE DATA RECORDING METHOD, PICTURE DATA STORAGE MEDIUM, PICTURE DATA PLAYBACK APPARATUS, AND PICTURE DATA PLAYBACK METHOD

CROSS-REFERENCE TO RELATED APPLICATIONS

This application is based upon and claims the benefit of priority from the prior Japanese Patent Application No. 2002-221831, filed Jul. 30, 2002, the entire contents of which are incorporated herein by reference.

BACKGROUND OF THE INVENTION

1. Field of the Invention

The present invention relates to a picture data recording method of recording picture data. The present invention also relates to a picture data storage medium which stores picture data. The present invention also relates to a picture data playback apparatus and method of playing back picture data.

2. Description of the Related Art

In recent years, a DVD (Digital Versatile Disk) has been developed as a high-density recording medium. A DVD video scheme is defined as a scheme of recording, on this medium, sub-picture data such as audio and subtitle data as well as main picture data.

Currently, a scheme of recording high-resolution main picture data and sub-picture data on a recording medium such as an optical disk has been examined as extension of the current DVD video standard.

The high-resolution main picture data and sub-picture data are synthesized and output to a high-resolution monitor that can cope with a high resolution. However, since standard monitors (NTSC monitors) are popular currently, the synthesized data of high-resolution main picture data and sub-picture data is converted to a standard resolution, i.e., down-converted and then output to the standard monitor.

Since sub-picture data contains steep edges, the image quality readily degrades upon down-conversion. That is, the above-described method of outputting high-resolution data to a standard monitor may degrade the image quality of sub-picture data displayed on the standard monitor.

BRIEF SUMMARY OF THE INVENTION

A picture data recording method according to an aspect of the present invention comprises compressing main picture data having a first resolution, sub-picture data having the first resolution, and sub-picture data having a second resolution lower than the first resolution, forming packets from the compressed data in accordance with predetermined units and multiplexing the packets, and recording the multiplexed data on a recording medium.

A picture data storage medium according to an aspect of the present invention comprises a first area which stores multiplexed data obtained by compressing main picture data having a first resolution, sub-picture data having the first resolution, and sub-picture data having a second resolution lower than the first resolution, forming packets from the compressed data in accordance with predetermined units, and multiplexing the packets, and a second area which stores management information which manages the multiplexed data.

A picture data playback apparatus according to an aspect of the present invention comprises acquisition unit for acquiring main picture data having a first resolution, sub-picture data having the first resolution, and sub-picture data having a second resolution lower than the first resolution, decoding unit for decoding the main picture data having the first resolution, the sub-picture data having the first resolution, and the sub-picture data having the second resolution, which are acquired by the acquisition unit, first synthesis unit for synthesizing the main picture data having the first resolution and decoded by the decoding unit with the sub-picture data having the first resolution and decoded by the decoding unit, conversion unit for converting the main picture data having the first resolution and decoded by the decoding unit into main picture data having the second resolution, and second synthesis unit for synthesizing the main picture data having the second resolution converted by the conversion unit with the sub-picture data having the second resolution and decoded by the decoding unit.

A picture data playback method according to an aspect of the present invention comprises acquiring main picture data having a first resolution, sub-picture data having the first resolution, and sub-picture data having a second resolution lower than the first resolution, decoding the main picture data having the first resolution, the sub-picture data having the first resolution, and the sub-picture data having the second resolution, which are acquired, and executing first synthesis processing of synthesizing the decoded main picture data having the first resolution with the decoded sub-picture data having the first resolution, converting the decoded main picture data having the first resolution into main picture data having the second resolution, and executing second synthesis processing of synthesizing the converted main picture data having the second resolution with the decoded sub-picture data having the second resolution.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the schematic arrangement of a picture data playback apparatus according to the embodiment of the present invention.

DETAILED DESCRIPTION OF THE INVENTION

The embodiment of the present invention will be described below with reference to the accompanying drawing.

Figure 1:
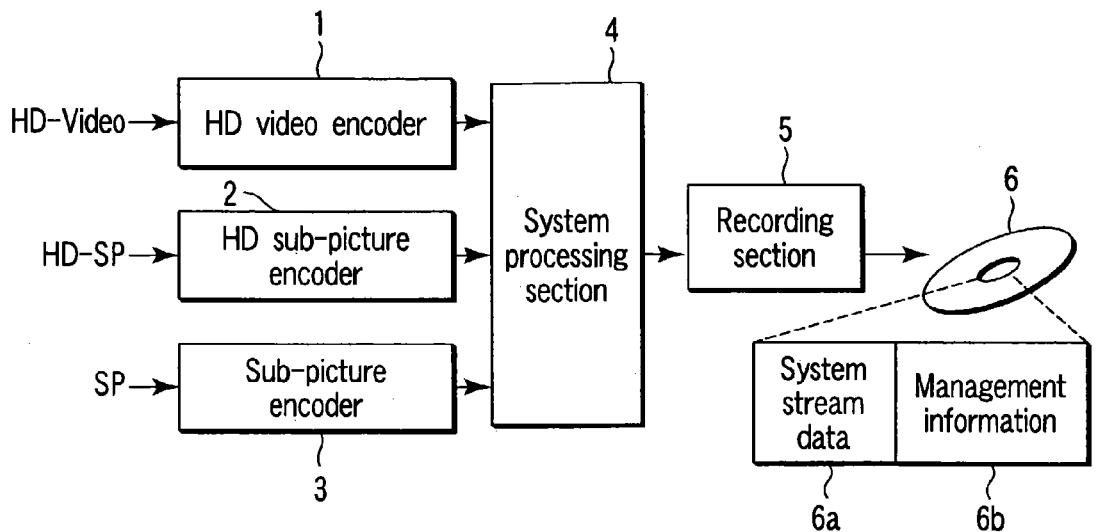
FIG. 1 is a block diagram showing the schematic arrangement of a picture data recording apparatus according to an embodiment of the present invention.

FIG. 1 is a block diagram showing the schematic arrangement of a picture data recording apparatus according to an embodiment of the present invention. In recording high-resolution main picture data and high-resolution sub-picture data as an extension of the current DVD video standard, this picture data recording apparatus records standard-resolution sub-picture data together.

As shown in FIG. 1, the picture data recording apparatus comprises an HD (High Definition) video encoder 1, HD sub-picture encoder 2, sub-picture encoder 3, system processing section 4, and recording section 5.

The HD video encoder 1 compresses high-resolution main picture data, i.e., main picture data having a first resolution by a predetermined compression method and supplies the compressed main picture data having the first resolution to the system processing section 4. The HD sub-picture encoder 2 compresses high-resolution sub-picture data, i.e., sub-picture data having the first resolution by a predetermined compression method and supplies the compressed sub-picture data having the first resolution to the system processing section 4. The sub-picture encoder 3 compresses standard-resolution sub-picture data, i.e., sub-picture data having a second resolution lower than the first resolution by a predetermined compression method and supplies the compressed sub-picture data having the second resolution to the system processing section 4. The system processing section 4 forms packets from the picture data supplied from the HD video encoder 1, HD sub-picture encoder 2, and sub-picture encoder 3 in accordance with predetermined units defined for the respective data and multiplexes the packets to generate system stream data. The recording section 5 records the system stream data generated by the system processing section 4 on a disk (information storage medium) 6.

Figure 2:
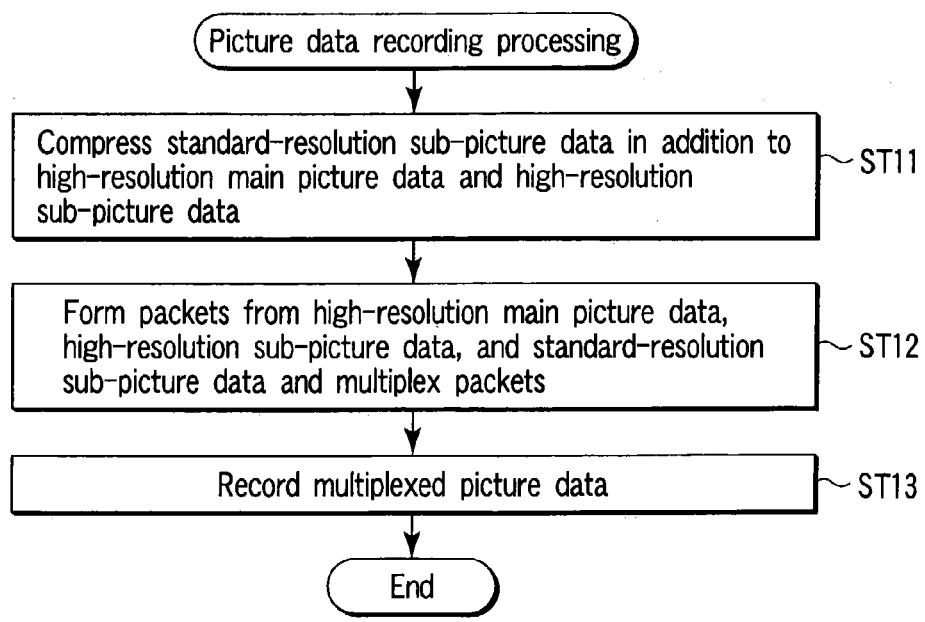
FIG. 2 is a flow chart showing picture data recording processing according to the embodiment of the present invention.

FIG. 2 is a flow chart showing picture data recording processing by the picture data recording apparatus. That is, this flow chart explains recording processing of high-resolution main picture data and high-resolution sub-picture data as an extension of the current DVD video standard.

As shown in FIG. 2, in addition to main picture data having the first resolution and sub-picture data having the first resolution, sub-picture data having the second resolution lower than the first resolution is compressed (ST11). Packets are formed from the compressed data in accordance with predetermined units and multiplexed (ST12). The multiplexed data is compressed (ST13).

In the above-described picture data recording processing, when high-resolution main picture data and high-resolution sub-picture data are to be recorded as an extension of the current DVD video standard, standard-resolution sub-picture data is recorded together. When the picture data recorded by this picture data recording processing is played back by playback processing (to be described later), the main picture data and sub-picture data having the high resolution can be displayed on a high-resolution (HD) TV monitor. In addition, the main picture data and sub-picture data having the standard resolution can be displayed on a standard monitor without any problem. Especially, a degradation in sub-picture data, which is a problem in the prior art, can be prevented.

The disk 6 shown in FIG. 1 has, e.g., a first area 6*a* and second area 6*b*. The first area 6*a* stores system stream data generated from main picture data having the first resolution, sub-picture data having the first resolution, and sub-picture data having the second resolution lower than the first resolution. On the other hand, the second area 6*b* stores management information necessary for playback of the system stream data.

On the disk 6, when high-resolution main picture data and high-resolution sub-picture data are to be recorded as an extension of the current DVD video standard, standard-resolution sub-picture data is recorded together. When the picture data recorded by this picture data recording processing is played back by playback processing (to be described later), the main picture data and sub-picture data having the high resolution can be displayed on a high-resolution (HD) TV monitor. In addition, the main picture data and sub-picture data having the standard resolution can be displayed on a standard monitor without any problem. Especially, a degradation in sub-picture data, which is a problem in the prior art, can be prevented.

FIG. 3 is a block diagram showing the schematic arrangement of a picture data playback apparatus according to the embodiment of the present invention. This picture data playback apparatus plays back, e.g., picture data recorded by picture data recording processing by the picture data recording apparatus described above.

As shown in FIG. 3, the picture data playback apparatus comprises a demultiplexer 7, HD video decoder 8, sub-picture decoder 9, HD sub-picture decoder 10, down-converter 11, first synthesis processing section 12, second synthesis processing section 13, high-resolution (HD) TV monitor 14, standard monitor 15, disk driver section 16, tuner section 17, output designation section 18, output designation memory 19, and main control section 20.

The disk driver section 16 functioning as a picture data acquisition unit reads out system stream data and management information stored in the disk 6 and supplies the system stream data to the demultiplexer 7. That is, the disk driver section 16 supplies main picture data having the first resolution, sub-picture data having the first resolution, and sub-picture data having the second resolution lower than the first resolution to the demultiplexer 7. The tuner section 17 functioning as picture data acquisition unit also reads out system stream data from a broadcast signal and supplies the data to the demultiplexer 7. That is, the tuner section 17 supplies main picture data having the first resolution, sub-picture data having the first resolution, and sub-picture data having the second resolution lower than the first resolution to the demultiplexer 7.

The demultiplexer 7 demultiplexes the main picture stream data having the first resolution, sub-picture stream data having the first resolution, and sub-picture stream data having the second resolution lower than the first resolution from the system stream data supplied from the disk driver section 16 or tuner section 17. The demultiplexer 7 also supplies the main picture stream data having the first resolution to the HD video decoder 8, the sub-picture stream data having the second resolution to the sub-picture decoder 9, and the sub-picture stream data having the first resolution to the HD sub-picture decoder 10.

The HD video decoder 8 decodes the main picture stream data having the first resolution to generate main picture data having the first resolution. The sub-picture decoder 9 decodes the sub-picture stream data having the second resolution to generate sub-picture data having the second resolution. The HD sub-picture decoder 10 decodes the sub-picture stream data having the first resolution to generate sub-picture data having the first resolution.

The down-converter 11 converts the main picture data having the first resolution, which is generated by the HD video decoder 8, into main picture data having the second resolution. That is, the down-converter 11 reduces the resolution of the picture data.

The first synthesis processing section 12 synthesizes the main picture data having the first resolution, which is generated by the HD video decoder 8, with the sub-picture data having the first resolution, which is generated by the HD sub-picture decoder 10, to generate first synthesized picture data. The second synthesis processing section 13 synthesizes the main picture data having the second resolution, which is generated by the down-converter 11, and the sub-picture data having the second resolution, which is generated by the sub-picture decoder 9, to generate second synthesized picture data.

The first synthesis processing section 12 is designed so its output is input to the high-resolution (HD) TV monitor 14. The second synthesis processing section 13 is designed so its output is input to the standard monitor 15. That is, the first synthesized picture data obtained by synthesizing the main picture data having the first resolution and the sub-picture data having the first resolution is displayed on the high-resolution (HD) TV monitor 14. The second synthesized picture data obtained by synthesizing the main picture data having the second resolution and the sub-picture data having the second resolution is displayed on the standard monitor 15.

The output designation section 18 designates output of one of the first synthesized picture data and second synthesized picture data. More specifically, when the user selects the high-resolution (HD) TV monitor 14, the output designation section 18 designates output of the first synthesized picture data (high-resolution picture data). When the user selects the standard monitor 15, the output designation section 18 designates output of the second synthesized picture data (standard-resolution picture data). The output designation memory 19 stores information designated by the output designation section 18.

The main control section 20 controls the respective blocks of the picture data playback apparatus. For example, the main control section 20 causes only one of the first synthesis processing section and second synthesis processing section to output synthesized data on the basis of information stored in the output designation memory 19. The power consumption can be reduced as compared to simultaneous output of synthesized data from both sections. If only the first synthesized picture data is to be output, the power consumption can further be reduced by stopping operating the sub-picture decoder 9 and down-converter 11. Similarly, if only the second synthesized picture data is to be output, the power consumption can further be reduced by stopping operating the HD sub-picture decoder 10.

Figure 4:
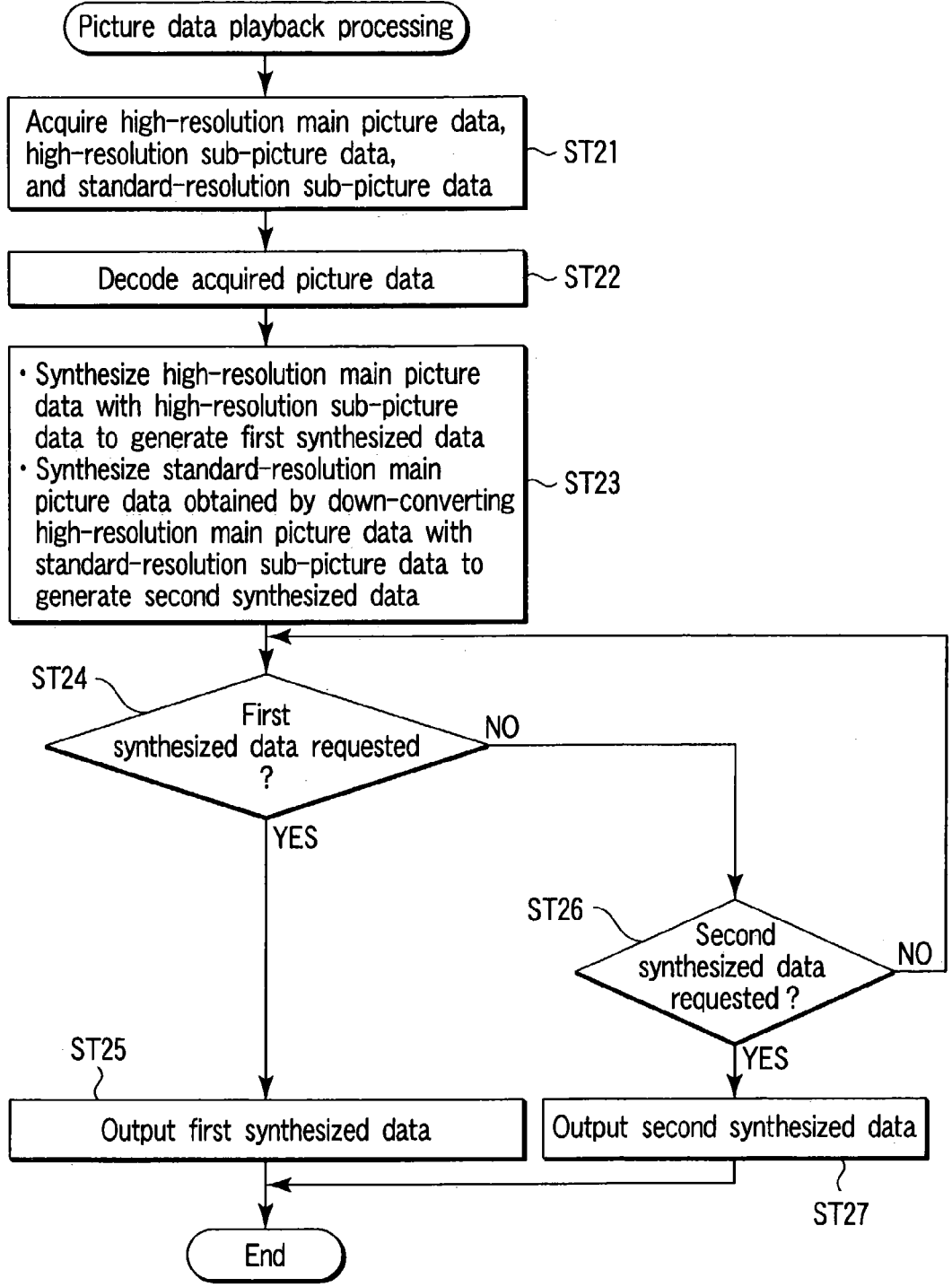
FIG. 4 is a flow chart showing picture data playback processing according to the embodiment of the present invention.

FIG. 4 is a flow chart showing picture data playback processing by the picture data playback apparatus. As shown in FIG. 4, main picture data having the first resolution, sub-picture data having the first resolution, and sub-picture data having the second resolution lower than the first resolution are acquired from a disk or broadcast signal (ST21). These acquired picture data are decoded (ST22). First synthesis processing of synthesizing the decoded main picture data having the first resolution with the decoded sub-picture data having the first resolution is executed, the decoded main picture data having the first resolution is converted into main picture data having the second resolution, and second synthesis processing of synthesizing the converted main picture data having the second resolution with the decoded sub-picture data having the second resolution is executed (ST23).

If first synthesized data obtained by synthesizing the main picture data having the first resolution with the sub-picture data having the first resolution is requested (YES in ST24), the first synthesized data is output (ST25). Accordingly, the high-resolution picture data is displayed on the high-resolution (HD) TV monitor 14. On the other hand, if second synthesized data obtained by synthesizing the main picture data having the second resolution with the sub-picture data having the second resolution is requested (YES in ST26), the second synthesized data is output (ST27). Accordingly, the standard-resolution picture data is displayed on the standard monitor 15.

In the above-described picture data recording apparatus and picture data recording processing, to display picture data of a high-resolution DVD disk on a high-resolution TV monitor as an extension of the current DVD video standard, high-resolution picture data and high-resolution sub-picture data are synthesized and output. To display picture data on a standard monitor, standard picture data obtained by converting the resolution of high-resolution picture data and standard sub-picture data are synthesized and output, thereby preventing any degradation in image quality of the sub-picture data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A picture data playback apparatus comprising:
    acquisition unit for acquiring main picture data having a first resolution, sub-picture data having the first resolution, and sub-picture data having a second resolution lower than the first resolution, without acquiring main picture data having the second resolution;
    conversion unit for converting the main picture data having the first resolution into the main picture data having the second resolution;
    first synthesis unit for synthesizing the main picture data having the first resolution, which has been acquired by the acquisition unit, and has not been converted by the conversion unit, with the sub-picture data having the first resolution, which has been acquired by the acquisition unit, and has not been converted by the conversion unit, to obtain first synthesized data having the first resolution;
    second synthesis unit for synthesizing the main picture data having the second resolution which has not been acquired by the acquisition unit, and has been generated by conversion by the conversion unit, with the sub-picture data having the second resolution which has been acquired by the acquisition unit, and has not been converted by the conversion unit, to obtain second synthesized data having the second resolution.

2. The apparatus according to claim 1, wherein the acquisition unit reads out the main picture data having the first resolution, the sub-picture data having the first resolution, and the sub-picture data having the second resolution lower than the first resolution from a picture data storage medium and acquires the data.

3. The apparatus according to claim 2, further comprising output control unit for causing one of the first synthesis unit and the second synthesis unit to output the synthesized data on the basis of output designation of one of the first synthesized data synthesized by the first synthesis unit and the second synthesized data synthesized by the second synthesis unit.

4. The apparatus according to claim 1, wherein the acquisition unit reads out the main picture data having the first resolution, the sub-picture data having the first resolution, and the sub-picture data having the second resolution lower than the first resolution from a broadcast signal and acquires the data.

5. The apparatus according to claim 4, further comprising output control unit for causing one of the first synthesis unit and the second synthesis unit to output the synthesized data on the basis of output designation of one of the first synthesized data synthesized by the first synthesis unit and the second synthesized data synthesized by the second synthesis unit.

6. A picture data playback method comprising:

acquiring main picture data having a first resolution, sub-picture data having the first resolution, and sub-picture data having a second resolution lower than the first resolution, without acquiring main picture data having the second resolution;

executing first synthesis processing of synthesizing the main picture data having the first resolution which has been acquired, and has not been converted, with the sub-picture data having the first resolution which has been acquired, and has not been converted, to obtain first synthesized data having the first resolution, converting the main picture data having the first resolution into main picture data having the second resolution, and executing second synthesis processing of synthesizing the the main picture data having the second resolution which has not been acquired, and has been generated by conversion, with the sub-picture data having the second resolution which has been acquired, and has not been converted, to obtain second synthesized data having the second resolution.

7. The method according to claim 6, wherein the main picture data having the first resolution, the sub-picture data having the first resolution, and the sub-picture data having the second resolution lower than the first resolution are read out and acquired from a picture data storage medium.

8. The method according to claim 7, wherein
the synthesis data synthesized by one of the first synthesis processing and the second synthesis processing is output the basis of output designation of one of the first synthesized data synthesized by the first synthesis processing and the second synthesized data synthesized by the second synthesis processing.

9. The method according to claim 6, wherein the main picture data having the first resolution, the sub-picture data having the first resolution, and the sub-picture data having the second resolution lower than the first resolution are read out and acquired from a broadcast signal.

10. The method according to claim 9, wherein
the synthesis data synthesized by one of the first synthesis processing and the second synthesis processing is output the basis of output designation of one of the first synthesized data synthesized by the first synthesis processing and the second synthesized data synthesized by the second synthesis processing.

* * * * *